United States Patent
Wang et al.

(10) Patent No.: US 9,974,123 B2
(45) Date of Patent: May 15, 2018

(54) POWER SUPPLY SYSTEM AND METHOD AND CIRCUIT USING THE SAME

(71) Applicant: PHILIPS LIGHTING HOLDING B.V., Eindhoven (NL)

(72) Inventors: Shan Wang, Eindhoven (NL); Kai Qi Tian, Eindhoven (NL); Gang Wang, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/320,313

(22) PCT Filed: Jun. 26, 2015

(86) PCT No.: PCT/EP2015/064508
§ 371 (c)(1),
(2) Date: Dec. 21, 2016

(87) PCT Pub. No.: WO2015/197814
PCT Pub. Date: Dec. 30, 2015

(65) Prior Publication Data
US 2017/0164436 A1   Jun. 8, 2017

(30) Foreign Application Priority Data

Jun. 27, 2014  (WO) ................ PCT/CN2014/081051
Oct. 3, 2014  (EP) ..................................... 14187656

(51) Int. Cl.
*G05F 1/00*  (2006.01)
*H05B 37/02*  (2006.01)
(Continued)

(52) U.S. Cl.
CPC ........... *H05B 33/0812* (2013.01); *G05F 1/56* (2013.01); *H05B 33/0815* (2013.01);
(Continued)

(58) Field of Classification Search
CPC ............ H05B 33/0815; H05B 33/0851; H05B 33/0848; H05B 37/02; H05B 37/0272;
(Continued)

(56) References Cited

U.S. PATENT DOCUMENTS 4,670,742 A * 6/1987 Wacha ..................... H02H 3/04
                                                    331/64
5,422,562 A * 6/1995 Mammano ................ G05F 1/44
                                                    323/222

(Continued)

OTHER PUBLICATIONS

Wan-Rone Liou et al, "Integrated Multi-Channel High Accuracy Current Control LED Driver with Low Dropout Regulator", Journal of Energy and Power Engineering 7,(2013), pp. 583-588.

*Primary Examiner* — Alexander H Taningco
*Assistant Examiner* — Christian L Garcia

(57) ABSTRACT

A power supply system uses a DC-DC power converter (28) for supplying an output load. A compensation circuit (40) is connected between the input to the DC-DC converter and the output of the DC-DC converter and it provides a compensating path in response to a voltage drop at the output of the DC-DC converter caused by a surge in the output load. The power supply system further comprises a low drop out regulator (30) as the output load, which low drop out regulator (30) having an input connected to the DC-DC power converter and the compensation circuit, and an output connected to an output terminal (C) for connection to a further output load. This enables the DC-DC power converter to have a low current capability, because a large current demand can be met by the DC supply to the DC-DC converter.

10 Claims, 3 Drawing Sheets

(51) Int. Cl.
*H05B 39/04* (2006.01)
*H05B 41/36* (2006.01)
*H05B 33/08* (2006.01)
*G05F 1/56* (2006.01)
*H02M 3/335* (2006.01)
*H05B 41/282* (2006.01)
*H02M 3/156* (2006.01)

(52) U.S. Cl.
CPC ........ *H02M 3/156* (2013.01); *H02M 3/33507* (2013.01); *H05B 33/0848* (2013.01); *H05B 33/0851* (2013.01); *H05B 37/02* (2013.01); *H05B 37/0272* (2013.01); *H05B 41/2828* (2013.01); *Y02B 20/346* (2013.01); *Y02B 20/347* (2013.01); *Y10S 362/80* (2013.01)

(58) Field of Classification Search
CPC . H05B 41/2828; Y10S 362/80; Y02B 20/347; Y02B 20/346; H02M 3/156; H02M 3/33507
USPC ... 315/307, 291, 224, 209 R, 308, 312, 297, 315/200 R; 323/282, 234, 285, 271; 363/37, 21.01
See application file for complete search history.

(56) References Cited

U.S. PATENT DOCUMENTS

| | | | |
|---|---|---|---|
| 6,181,120 | B1 | 1/2001 | Hawkes et al. |
| 6,320,452 | B1 | 11/2001 | Chen |
| 8,072,196 | B1 | 12/2011 | Li |
| 8,378,652 | B2 | 2/2013 | Xie |
| 2006/0022653 | A1 | 2/2006 | Reed et al. |
| 2007/0210775 | A1* | 9/2007 | Bothra ............... H02M 3/158 323/283 |
| 2010/0141153 | A1* | 6/2010 | Recker ............... H05B 33/0803 315/149 |
| 2011/0156671 | A1 | 6/2011 | Gakhar et al. |
| 2013/0169172 | A1 | 7/2013 | Kesterson et al. |

\* cited by examiner

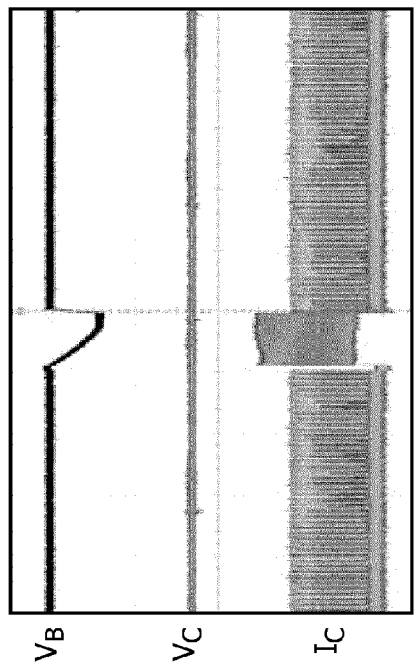
FIG. 3(a)
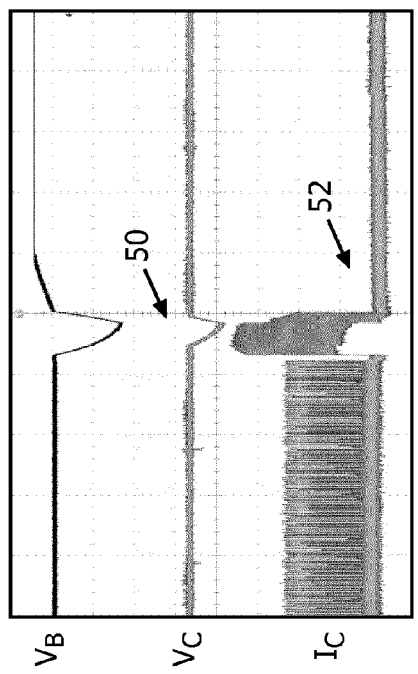
FIG. 3(b)
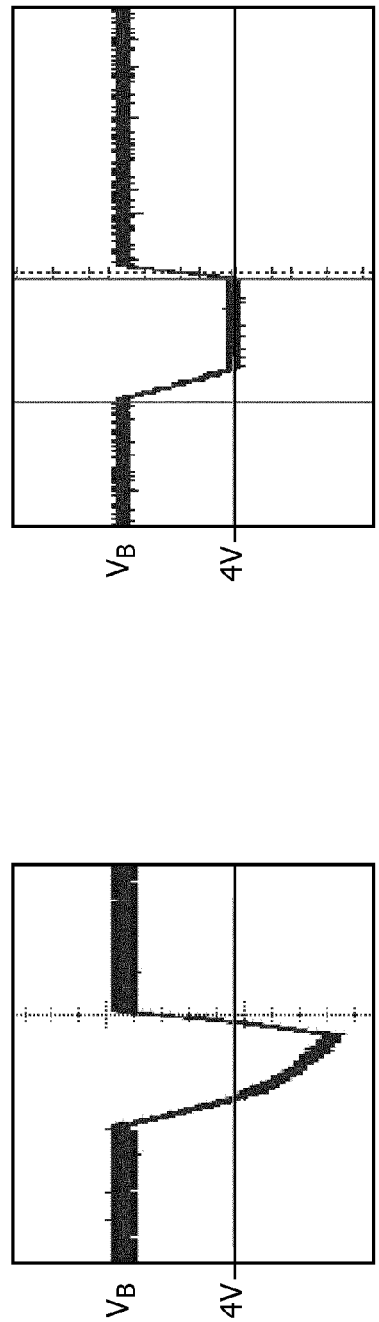
FIG. 4(a)
FIG. 4(b)

POWER SUPPLY SYSTEM AND METHOD AND CIRCUIT USING THE SAME

CROSS-REFERENCE TO PRIOR APPLICATIONS

This application is the U.S. National Phase application under 35 U.S.C. § 371 of International Application No. PCT/EP2015/064508, filed on Jun. 26, 2015, which claims the benefit of priority to Chinese Patent Application No. PCT/CN2014/081051, filed on Jun. 27, 2014 and European Patent Application 14187656.5, filed on Oct. 3, 2014. These applications are hereby incorporated by reference herein.

FIELD OF THE INVENTION

This invention relates to a power supply system, in particular for supplying loads with surges in current demand.

BACKGROUND OF THE INVENTION

The invention is of particular interest for lighting applications.

Wireless lighting control is gaining popularity together with the market growth of LED lighting. Wireless lighting control is realized by integrating a low power RF module into the lighting unit to enable wireless connectivity. For example, the recently launched Philips hue bulb brings wireless connectivity to an LED bulb by integrating a ZigBee module into the bulb. The bulb also contains a microcontroller to control both the RF module and the LED light source for intelligent light control.

FIG. 1 is a block diagram of an example of an LED light point with RF connectivity. The main power source 10 is a relatively high voltage (e.g., 20-30V) DC voltage source for the whole light point including LED light source 12, controller 14, RF module 16 (i.e., an RF transceiver 18 and an optional RF amplifier 20) and other control circuits 22 (such as logic circuits, MOSFET drivers, etc.). The power source can include an AC-DC converter if driven by the mains. The LED light source 12 receives power from the power source 10 via an LED driver 24.

Most control circuits in LED light points usually operate at a relatively low DC voltage such as 5 V (DC), and most controllers and RF modules operate at an even lower DC voltage such as 3.3 V (DC).

For the sake of power efficiency, a power supply 26 is used between the high voltage power source 10 and the controller 14 and other circuits. The function of the power supply 26 is to decrease the voltage to a proper level. The power supply 26 contains two components, a DC-DC converter 28 which converts the voltage from the power source to 5 V (DC), and a voltage regulator 30 which further decreases the voltage from the DC-DC converter to 3.3 V (DC).

The controller 14 and the RF transceiver 18 of the RF module 16 can be on a single chip. For example, ZigBee system on chip products are known containing a controller and a 2.4 GHz RF transceiver.

For light points such as an MR16 LED bulb, which usually has a metal heat sink covering almost the whole surface of the fixture and in which the light point is installed in a metal dome, the RF amplifier 20 is necessary to ensure adequate RF performance, such as increased transmitting power (or working distance) and it includes a low-noise amplifier for improved receiving sensitivity.

An important requirement for the power supply 26 is to provide enough current at a constant voltage (e.g., 3.3 V (DC)) to ensure the normal operation of the controller and RF module. There are three typical operation modes which consume different levels of current:

Non-RF mode: only the controller is active and no RF communication takes place. The operating current is for example less than 10 mA.

Receive mode: the RF module is in receiving operation. The operating current of the RF transceiver is for example in the range of 20-30 mA. The operating current of the RF amplifier is for example less than 5 mA. Therefore the total current requirement is 30-40 mA.

Transmit mode: the RF module is in transmitting operation. The operating current of the RF transceiver is for example in the range of 30-40 mA. The operating current of the RF amplifier is for example in the range of 80-180 mA. Therefore the total current requirement is 120-240 mA.

Clearly the transmission operation requires significantly higher current than the other operations. Another feature of the transmission operation is that it is a periodic operation with low frequency and extremely short duration. For example, on average every 5-15 seconds there is a transmission with a duration of less than 10 milliseconds. In other words, most of the time the controller and RF module consumes 10-40 mA, but demands high peak (120-240 mA) transient currents during the periodic transmit operation.

There are two commonly adopted approaches for designing the power supply 26 for wireless connected LED light points.

The first approach is to use a DC-DC converter with high current supply capacity and fast transient response to accommodate the high peak transient current demand from the RF module when transmitting. The main disadvantage is that such converters are bulky and expensive, which limits the usage in applications where compact space and low-cost are mandatory.

The second approach is to use a normal DC-DC converter together with a large value reservoir capacitor or electrolytic capacitor. The converter can tolerate the receiving operation of the RF module, while the capacitor can help to absorb the transient peak currents during the transmission operation. This approach has a lower cost compared with the first approach, but a large value (e.g., in the range of 100-200 µF) capacitor is still bulky.

Considering the need to enable wireless connectivity for LED light points with compact size (such as MR16 or MR11 bulbs), a low-cost and compact power supply solution is desired.

U.S. Pat. No. 5,422,562A1, US20060022653A1 and "Linear-nonlinear control applied to switching power supplies to get fast transient response", 10.1109/IECON.2002.1187556 disclose that a second power supply can provide power to a load in case the power from a first power supply to the load is not enough.

SUMMARY OF THE INVENTION

It would be advantageous to have a circuit which can meet the surge in current demand and also is low cost and small sized.

The invention is defined by the claims.

According to an aspect of the invention, there is provided a power supply system, comprising:

a DC power source for generating a first DC output;

a DC-DC power converter for generating a second DC output from the first DC output and providing the second DC output to a supply terminal of the power supply system for supplying an output load; and a compensation circuit connected between the first DC output and the supply terminal, the compensation circuit is adapted to provide power to the supply terminal from the first DC output in response to a voltage drop in the second DC output, wherein the power supply system further comprises a low dropout regulator as the output load, which low dropout regulator having an input connected to the supply terminal and an output connected to an output terminal for connection to a further output load.

For example, the voltage drop is caused by a surge in the output load supplied by the supply terminal.

This system enables the first DC output to be used as the supply for an output load, which is normally supplied by the second DC output (which has a lower voltage than the first). This enables the DC-DC power converter to have a low current capability, because a large current demand from the output can be met by the first DC supply. The DC-DC converter can be kept at low cost and low size suitable for the output load characteristics which arise for the majority of the time, and surges in demand can still be met. The ultimate output load is typically a circuit with periodic but short duration surges in demand. This arrangement avoids the need for large storage capacitors to cope with surges and avoids the need for over-dimensioning of the DC-DC converter.

In one embodiment, the first DC output is preferably in a voltage range higher than a voltage range of the second DC output, and the DC power source may comprise an AC-DC converter. This embodiment gives an implementation of the aspect of invention into the widely used power structure with an AC-DC converter and a DC-DC converter.

The first DC output may for example be for LED lighting circuits and the second DC output may be for ancillary control circuitry such as an RF module. The higher voltage first DC output is then used to supply the ancillary control circuitry when there are surges in demand which cannot be met by the DC-DC converter. The DC power source can be supplied by an AC mains signal and thus include an AC-DC converter.

In one embodiment, the compensation circuit may comprise a switch between the first DC output and the second DC output, and a control circuit for controlling the operation of the switch.

The switch couples the first DC output to the second DC output. When the switch is closed, the higher voltage first DC output can be used to supply the load and the switch can open again once the desired current has been sourced to enable the load demand to be met. The advantage of this embodiment is the component count is less.

In one embodiment, the switch may comprise a transistor arrangement having a base connection and an emitter connection which together control the switch state, wherein the control circuit comprises a voltage generating circuit which generates a voltage for application to the base connection, and the emitter connection connects to the second DC output.

The voltage at the second DC output is used as a first transistor control parameter applied to a transistor emitter and a reference voltage is used as a second control parameter applied to the transistor base. The voltage at the second DC output will drop if the DC-DC converter is not able to meet the load demand, and this drop in voltage can be used to control the compensation circuit. The transistor may instead be a field effect transistor, with a gate corresponding to the base and a source corresponding to the emitter. In this case, the gate-source voltage varies in response to a voltage drop to cause the transistor to turn on. The advantage is that the function of sensing voltage drop and controlling the switch is implemented based on the single (bipolar or field effect) transistor so that the circuit structure is simple.

In one embodiment, the voltage generating circuit may comprise a current limiting resistor between the first DC output and the base connection and a voltage regulating diode arrangement.

This provides a simple way of setting the voltage to be applied to the base connection. Changes in the voltage at the second DC output influence the base-emitter voltage and thereby control the transistor switching.

In one embodiment, the voltage regulator can be a low drop out regulator, for providing a DC voltage with a voltage below the voltage of the second DC output. This provides a stable reference point so that a constant voltage is maintained at the base connection (by the diode arrangement). A low drop out voltage regulator needs a stable input voltage to maintain its output. This input is provided by the DC-DC converter, so that fluctuations in the DC-DC converter output, which are prevented by the system of the invention, could otherwise cause drop out of the voltage regulator.

The voltage regulator can be used for supplying circuits (i.e. a further output load) needing a lower voltage than the voltage of the second DC output which supplies a first output load. There may for example be control circuits as the first output load (e.g. at 5V), microprocessor circuits and RF circuits as the further output load (e.g. at 3.3V) and lighting circuits (e.g. at 20V) as an output load of the main power supply 10. The microprocessor circuits for example need a stable supply, and the system prevents the DC-DC converter output having large fluctuations in response to load surges.

In one embodiment, the diode arrangement may comprise two diodes in series between the base connection and the output terminal. The advantage is the forward voltage of the two diodes provides an accurate reference voltage for application to the base connection.

In a second aspect of the invention, it also provides a circuit comprising:

a power supply system of the invention; and the output load, wherein the output load comprises an load with a transient burst power request.

The load may comprise an RF transceiver circuit and the surge in output load comprises a transmit mode of the RF transceiver circuit. The RF transceiver may have a high current burst mode of operation, particularly in transmit mode, and this can be the cause of the output load surges. In this embodiment, the surge in current demand by the RF transceiver can be addressed.

In an embodiment, a lighting system may be powered by the first DC output, comprising an LED driver circuit and an LED lighting arrangement, wherein the RF transceiver circuit is for receiving lighting commands and sending lighting status information.

This provides an intelligent lighting system which can have a low cost supply circuit for the RF transceiver circuit.

In a third aspect of the invention, it also provides a power supply method, comprising:

generating a first DC output;

generating a second DC output from the first DC output using a DC-DC power converter and providing the second DC output to a supply terminal;

providing power to the supply terminal using a compensation circuit in response to a drop in the second DC output; and regulating the DC voltage at the supply terminal by a low dropout regulator and supplying the regulated voltage as an output.

For example, the drop is caused by a surge in an output load supplied by the supply terminal.

Using the compensation circuit preferably comprises switching the first DC output to the second DC output.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which:

FIG. 3 shows timing diagrams to illustrate the operation of the circuit of the invention; and FIG. 4 shows one of the traces of FIG. 3 in enlarged form.

DETAILED DESCRIPTION OF THE EMBODIMENTS

The invention provides a power supply system which uses a DC-DC power converter for supplying an output load. A compensation circuit is connected between the input to the DC-DC converter and the output of the DC-DC converter and it provides a compensating power path in response to a voltage drop at the output of the DC-DC converter caused by a surge in the output load. This enables the DC-DC power converter to have a low current capability, because a large current demand can be met by the DC supply to the DC-DC converter.

The invention provides a low-cost and compact power supply solution to efficiently satisfy the demand of transient peak currents for example from loads such as the RF module in wirelessly controlled LED light points. The invention can be based on a conventional power supply design, by adding a self-adaptive circuit. When there is a demand of transient peak current generated by the transmit operation of the RF module, the circuit will be triggered into the activated state and release enough current from the resource-rich power source to the RF module. After the transmit operation, the circuit can then automatically switch back to a closed state.

For most of the time when the operating current is at normal levels (e.g., 10-40 mA), the self-adaptive circuit keeps the inactivated state. Only when there is a transmission operation, the circuit is triggered into the activated state and releases enough current (e.g., 300 mA) from the power source to tolerate the transient peak current of the RF module.

Figure 1:
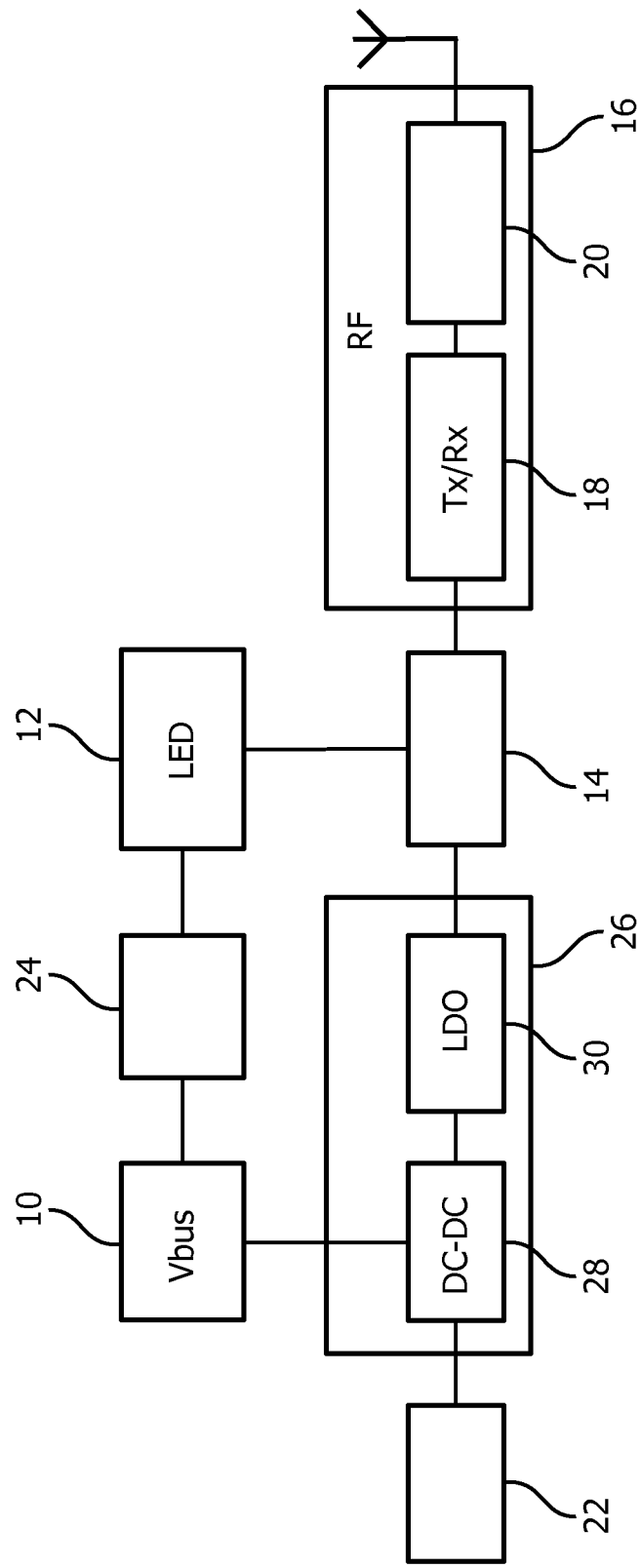
FIG. 1 shows a known architecture for the power supply arrangement of an intelligent lighting unit.
Figure 2:
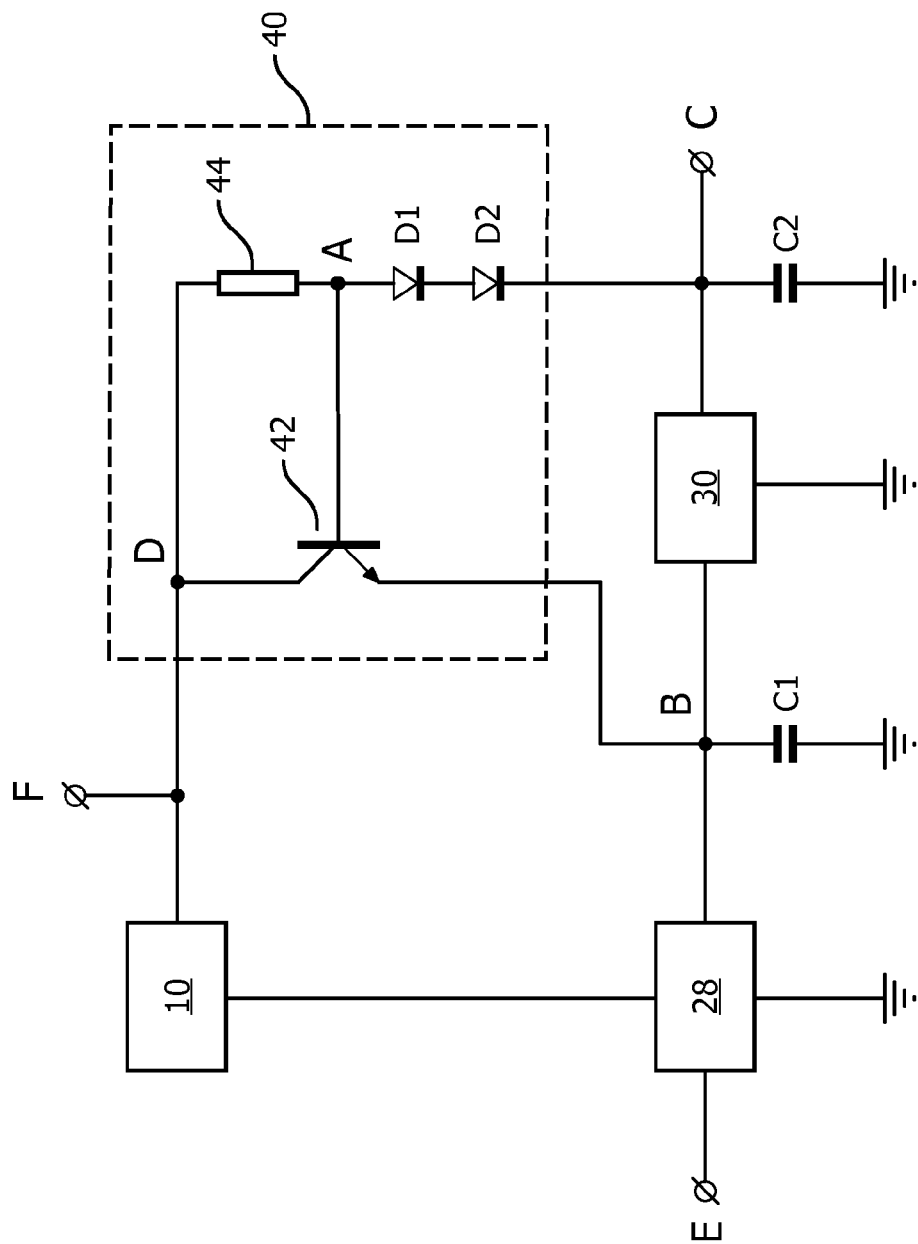
FIG. 2 shows a modification to the circuit of FIG. 1 in accordance with the invention.

FIG. 2 shows how the circuit of FIG. 1 can be modified in accordance with the invention. For simplicity, some components (e.g., the light source 12 and driver 24) in FIG. 1 are omitted.

The power source 10 for example provides a 20-30 V (DC) bus as the power source for the whole light point.

The DC-DC converter 28 comprises a switch mode power supply which converts the voltage from the bus voltage to 5 V (DC) for powering the control circuits. The power supply further comprises a voltage regulator 30 such as a LDO (low-dropout) regulator. This further decreases the voltage to 3.3 V (DC) for the controller 14 and RF module 16 which connects to point C. An LDO regulator can operate with small differential between the input and output voltage and with high efficiency. A low-dropout or LDO regulator is a DC linear voltage regulator which can regulate the output voltage even when the supply voltage is very close to the output voltage. A typical low dropout regulator comprises a power FET and a differential amplifier (error amplifier). One input of the differential amplifier monitors the output. The second input to the differential amplifier is from a stable voltage reference. If the output voltage rises too high relative to the reference voltage, the drive to the power FET changes to maintain a constant output voltage.

The current supply capacity of the DC-DC converter 28 (the switch mode power supply) is for example in the range of 30-50 mA which is enough for the receive operation of the RF module. When there is no space for a large value capacitor, the output voltage of the DC-DC converter 28 at point B will be pulled down rapidly by the peak transient current of a transmission operation. When the voltage drops below the minimum operating voltage of the LDO voltage regulator, there will be no output from the LDO voltage regulator 30 to power the controller and RF module. The minimum operating voltage is the output voltage of the LDO voltage regulator (e.g., 3.3 V (DC)) plus the dropout voltage, which is component dependent.

For example, if the dropout voltage of the LDO voltage regulator is 0.2 V (DC), then the minimum operating voltage is 3.5V which is the minimum voltage of point B for maintaining the smooth operation of the controller and RF module.

The invention provides a self-adaptive circuit 40 to ensure current supply to the point B in the event of a current surge in the ultimate output load.

The self-adaptive circuit 40 has a bipolar NPN transistor 42 with its collector connected to the high voltage DC bus, and its emitter connected to the point B. This point B can be considered to be a supply terminal to which the output of the DC-DC converter 28 is connected. In this example, the output load which connects to the terminal B is the converter 30 (and indirectly the load driven by the converter 30). The output of the voltage regulator 30 (point C) can be considered to be an output terminal to which a further load is connected, namely the controller 14 and RF module 16.

The base of the transistor 42 connects to the collector through a current limiting resistor 44. The base also connects through two series diodes D1 and D2 to the output (point C) of the voltage regulator 30. These diodes functions as elements for reference voltage setting. The circuit operates in two states, a closed state and an open state in which a power compensating function is implemented.

For most of the time when the operating current of the controller and RF module is within the current supply capacity of the DC-DC converter 28 (the switch mode power supply) the self-adaptive circuit 40 maintains the closed state. In this state, the voltage of the base terminal of transistor 42 (i.e., point A) is maintained at $V_A$, which can be calculated by adding the voltage of point C (i.e. the regulated voltage $V_C$) and the threshold voltages of D1 and D2. If D1 and D2 are silicon diodes with 0.7 V threshold voltage, $V_A$ will be 4.7 V (i.e., 3.3+0.7*2). The voltage of the emitter of the transistor 42 (i.e., point B) is maintained at $V_B$, which is the output voltage of the switching power supply (i.e., 5V).

Since both $V_B$ and $V_D$ are higher than $V_A$, transistor 42 is switched off meaning there is very little current flow from point D through the transistor 42 to point B.

Current from the higher DC voltage bus flows through the current limiting resistor 44 to point C at the output of the voltage regulator. The amount of current flowing through the resistor 44 ($I_{R1}$) depends on the resistance (R1) of the resistor 44 and can be calculated by $(V_{Vbus}-V_A)/R1$.

$I_{R1}$ can be regulated to level several mA. For example, if $I_{R1}$ is required to be 3 mA, then the resistance of R1 can be in the range 5.1 kOhm-8.4 kOhm.

When the transistor is open (i.e. switched off), the current flows to the diodes D1 and D2 and finally to the controller 14 and the RF circuitry 18,20. When the transistor is closed (i.e. switched on) the current flows to the base of the transistor.

When there is a transmit operation, $V_B$ is pulled down rapidly. When the difference of $V_A$ and $V_B$ exceeds the threshold voltage (i.e., 0.7 V for a silicon transistor) of the base-emitter junction of transistor 42, the transistor is turned on and the self-adaptive circuit 40 is triggered into the open state to release current from the main high voltage power source 10 (i.e., Vbus) to the output of the DC-DC converter 28. In this mode, the circuit 40 functions to compensate the DC-DC converter since current is also supplied directly from the main power supply 20 to the voltage regulator 30.

For example, since $V_A$ is 4.7 V, the circuit will enter into this opened state when $V_B$ decreases to 4V. The amount of current released is approximately a factor β (typically greater than 100) times the base terminal current of the transistor, which is a bit smaller than $I_{R1}$. This is for the linear mode of operation of the transistor 42 with current gain of β.

If $I_{R1}$ is 3 mA and β is 100, a maximum of 300 mA current can be injected to the node B to enable the high peak transient current to be tolerated. Due to the fast response nature of transistors, which is of the order of microseconds, $V_B$ starts rapidly increasing by charging of the capacitor C1. The capacitor C1 functions as a buffer of the switch mode power supply. In a current inrush state, the transistor 42 injects current to both C1 and the load to maintain the voltage $V_B$ at certain level.

When the difference between $V_A$ and $V_B$ becomes smaller than the combined threshold voltages of the diodes, the base terminal current of the transistor becomes zero which stops the injection of current from Vbus to the power supply. Since the transmit operation is still ongoing (having a longer duration than the switching of the transistor 42), $V_B$ starts decreasing again and then the transistor is again switched on again to start injecting current. Since the current injection happens with high frequency, the current injection happens extremely fast, so $V_B$ is essentially stabilized at 4V during the whole period of the transmission operation.

After the transmission operation, $V_B$ increases to 5V and the self-adaptive circuit switches back to the closed state.

The functioning of the circuit has been tested, using Texas Instruments (trade mark) components TI CC2530 and CC2590 as the controller and the RF module. Measurements indicate that for most of the time, the average operating current is 17.8 mA. Every 15 seconds there is an RF transmitting operation of 2 milliseconds and the average current is then 91.5 mA.

Note that in FIG. 2, point D is the output of the main power source 10, point E is the connection to other circuit elements 22, and point F is the connection to the LED 12 and driver 24.

FIGS. 3(*a*) and 3(*b*) each show the waveform (against time) of the voltage $V_B$ at the input to the voltage regulator (i.e. the supply terminal as defined above), the voltage $V_C$ at the output of the voltage regulator (i.e. the output terminal as defined above) and the current $I_C$ drawn from node C by the controller and RF module.

FIG. 3(*a*) shows the waveforms for the circuit of FIG. 1 with no modification and FIG. 3(*b*) shows the waveform for the circuit of FIG. 2.

FIG. 3(*a*) shows at point 50 that there is a decrease in the output voltage of the voltage regulator. This causes the controller to reset hence the drop in current during time 52.

FIG. 3(*b*) shows that despite the drop in the voltage $V_B$, the voltage $V_C$ is maintained.

FIG. 4 is an enlarged view of the waveform of $V_B$. When there is a transmission operation, the conventional power supply encounters a problem shown in FIG. 4(*a*). $V_A$ quickly drops below 3.5V and the voltage regulator stops working which leads to resetting of the controller. During controller resetting, which usually takes several seconds, there is no current consumption (i.e., $I_A$ is zero) so $V_B$ starts increasing. The sudden drop of load current has a negative impact on the voltage regulator (switch mode power supply) resulting in an unstable voltage output during the controller resetting.

On the other hand, the power supply solution of the invention as shown in FIG. 4(*b*) is able to stabilize $V_C$ at 4V to maintain the normal operation of voltage regulator and the controller.

In general, the invention can be used to realize a power supply for systems containing loads which demand transient peak currents, and having constraints on space and cost. The example of a compact LED light point with embedded RF module is only one example.

Many other examples of device include a wireless transceiver which may high demand transient peak currents during a transmit operation. The invention can be used in such devices to enable a compact arrangement which can deliver the required current output during those peaks in demand.

The switch used to provide a compensating function is shown as a bipolar transistor. Other switches can be used, for example based on field effect transistors. The simplest version uses a single transistor but transistor arrangements with multiple transistors may be used.

The control of the switching is shown as using voltage levels within the circuit. This provides a most simple implementation. Alternatively, voltage monitoring circuitry may be used (for example a comparator circuit) which then controls a drive circuit for controlling the transistor or transistor arrangement. Thus, there are various other ways to implement a voltage-dependent current injection circuit.

The diodes are used to provide a fixed voltage difference. Other fixed-voltage circuit elements can be used, such as diode-connected transistors, Zener diodes, or voltage reference devices such as shunt voltage regulators.

The power supply may be of any suitable type, such as a buck converter, a buck-boost converter, a boost converter or a charge pump. Any suitable linear regulator can be used.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A power supply system, comprising:
a DC power source for generating a first DC output;
a DC-DC power converter for generating a second DC output from the first DC output and providing the second DC output to a supply terminal of the power supply system for supplying an output load; and
a compensation circuit connected between the first DC output and the supply terminal, the compensation circuit is adapted to provide power to the supply terminal from the first DC output in response to a voltage drop in the second DC output,
wherein the power supply system further comprises a low dropout regulator as the output load, the low dropout regulator having an input connected to the supply terminal and an output connected to an output terminal for connection to a further output load;
wherein said compensation circuit comprises:
a switch between the first DC output and the supply terminal, and
a control circuit for controlling the operation of the switch,
wherein the switch comprises a transistor arrangement having a base connection and an emitter connection which together control a switch state of the transistor, and the emitter connection connects to the supply terminal, and
wherein the control circuit comprises a voltage generating circuit which generates a voltage for application to the base connection, the voltage generating circuit comprising a voltage regulating diode arrangement between the base connection and the output terminal, the diode arrangement comprises two diodes in series between the base connection and the output terminal.

2. A system as claimed in claim 1, wherein the voltage drop is caused by a surge in the output load supplied by the supply terminal, the first DC output is in a voltage range higher than a voltage range of the second DC output, and wherein the DC power source comprises a AC-DC converter.

3. A system as claimed in claim 2, wherein the voltage generating circuit further comprises a current limiting resistor between the first DC output and the base connection and a voltage regulating diode arrangement.

4. A circuit comprising:
a power supply system as claimed in claim 1; and
the output load,
wherein the output load comprises a load with a transient burst power request.

5. A circuit as claimed in claim 4, wherein the load comprises an RF transceiver circuit and the surge in output load comprises a transmit mode of the RF transceiver circuit.

6. A circuit as claimed in claim 4, further comprising a lighting system powered by the first DC output, comprising an LED driver circuit and an LED lighting arrangement, wherein the RF transceiver circuit is for receiving lighting commands and sending lighting status information.

7. A power supply method, comprising:
generating a first DC output;
generating a second DC output from the first DC output using a DC-DC power converter and providing the second DC output to a supply terminal;
providing power to the supply terminal using a compensation circuit in response to a drop in the second DC output; and
regulating the DC voltage at the supply terminal by a low dropout regulator and supplying the regulated voltage as an output terminal;
wherein said step of providing power using the compensation circuit comprises:
providing a transistor arrangement having a collector connection to the first DC output, an emitter connection connects to the supply terminal, and a base connection, wherein said base connection and said emitter connection together control the switch state of the transistor;
generating a voltage for application to the base connection by a diode arrangement between the base connection and the output terminal, the diode arrangement comprises two diodes in series between the base connection and the output terminal.

8. A method as claimed in claim 7, wherein the drop is caused by a surge in an output load supplied by the supply terminal, and using the compensation circuit comprises switching the first DC output to the supply terminal.

9. A method as claimed in claim 7, comprising supplying an output load which comprises an RF transceiver circuit using the supply terminal.

10. A method as claimed in claim 9, further comprising powering a lighting system using first DC output, wherein the RF transceiver circuit is for receiving lighting commands and sending lighting status information.

* * * * *